(12) United States Patent
Spokoyny

(10) Patent No.: US 6,455,456 B1
(45) Date of Patent: Sep. 24, 2002

(54) METHOD FOR THE IN-SITU CLEANING OF THE CATALYTICALLY ACTIVE SURFACES OF SCR SUBSTRATE

(75) Inventor: Felix E. Spokoyny, Newport Coast, CA (US)

(73) Assignee: Hera, LLC, Lake Forest, CA (US)

( * ) Notice: Subject to any disclaimer, the term of this patent is extended or adjusted under 35 U.S.C. 154(b) by 155 days.

(21) Appl. No.: 09/724,162

(22) Filed: Nov. 28, 2000

Related U.S. Application Data

(60) Provisional application No. 60/167,804, filed on Nov. 29, 1999.

(51) Int. Cl.⁷ .................................................. B01J 37/34
(52) U.S. Cl. ............................................. 502/20; 502/5
(58) Field of Search ........................................ 502/5, 20

(56) References Cited

U.S. PATENT DOCUMENTS

| | | | | |
|---|---|---|---|---|
| 4,086,184 A | * | 4/1978 | Henry et al. ................. | 208/108 |
| 4,914,256 A | * | 4/1990 | Rodewald ....................... | 134/1 |
| 5,132,270 A | * | 7/1992 | Wachholz et al. ............ | 502/31 |

* cited by examiner

*Primary Examiner*—Stanley S. Silverman
*Assistant Examiner*—Edward M. Johnson
(74) *Attorney, Agent, or Firm*—Howard E. Sandler

(57) ABSTRACT

A method and apparatus for cleaning the catalytically active surfaces of selective catalytic reduction (SCR) substrate, and more particularly such a method and apparatus which: simultaneously generates two differing frequency sound waves which are effective in cleaning such surfaces, more effectively than if only single waves of such frequency were generated; utilizing spaced arrays of sound emitters at the entry and exit sides of selected SCR layers, with the emitters on opposite sides of the layers being in counter phase, or opposed synchronization; teaches design and placement of sound sources which optimize a variety of output cleanability predictions, for example pulsating pressure distribution, pulsating velocity distribution (U, V, W), time-averaged parameters and measure of cleanability.

13 Claims, 3 Drawing Sheets

METHOD FOR THE IN-SITU CLEANING OF THE CATALYTICALLY ACTIVE SURFACES OF SCR SUBSTRATE

RELATED APPLICATION

This application claims as its prioirty date, the date of its U.S. Provisional Application Ser. No. 60/167,804, filed Nov. 29, 1999.

BACKGROUND OF THE INVENTION

Large amounts of fossil fuels such as coal, oil, natural gas, and to some extent, biofuels, are used in power production, industrial processes, and transportation. Due to the increase in the use of these fuels, release of sulfur dioxides, nitrogen oxides, and carbon dioxide gases have also increased. In the atmosphere, these gases disperse widely and contribute to tropospheric photochemical smog, ozone formation, wet and dry acid disposition, stratospheric acid disposition, and the "greenhouse effect". Recently, great interest has been shown in oxides of nitrogen, that is, in nitric oxide (NO) and nitrogen dioxide $NO_2$), which are jointly termed $NO_x$, because they are pathogenic in humans, animals, and plants, and initiate noxious photochemical processes in the atmosphere.

Different measures are typically used in attempts to control or alleviate $NO_x$, namely the so-called primary and secondary measures. In the primary measures, a number of combustion modifications may be made to reduce $NO_x$ emissions. There are many different possibilities of boiler modifications, such as low excess air, biased burner firing, over-fire air, flue gas recirculation, and the like, as well as any combination of these and other primary modifications.

When the limits of $NO_x$ emissions cannot be met with combustion control only, flue gas treatments systems, so-called secondary, or post-combustion, measures, may have to be implemented. Among these secondary measures, the dominant method in use for significant NOx reduction requirements is selective catalytic reduction (SCR). In many instances, an SCR installation may provide $NO_x$ reduction as high as 80–90%, or more.

In the SCR method the NOx concentration in the flue gas is reduced through injection of ammonia and passing the flue gas through a catalyst. The role of the catalyst and the reaction mechanism with the added ammonia results in the production of the products which are harmless to the environment. The SCR reaction is selective, which means the oxidation of ammonia and sulfur dioxide should not occur.

The efficiency of SCR system is dependent upon several factors, such as $NO_x$, concentration at the inlet of the catalyst, the flue gas temperature and composition, the ratio of injected ammonia injection to NOx concentration, and catalyst relative size and properties such as space velocity, catalyst activity, pitch (in the case of honeycomb catalyst) and active catalytic area. Furthermore, a number of other factors, such as the chemical formulation of the catalyst, the type and chemical composition of the fuel being burned, add-mixtures being used for boiler conditioning or deslagging requirements, ammonia dispensing techniques, and the like, also have very significant effects on the efficiency and life of the catalyst being used in any SCR process. In other words, the nature of the SCR system, coupled with the flyash and other physical contaminants in the flue gas stream, can cause the grid or open area for flue gas flow through the catalyst to be reduced or completely closed. This reduction in flue gas flow through the catalyst modules in turn will result in inefficiencies of NOx removal, increased ammonia slip, additional system back pressure and, often, and premature failure of the SCR system.

Historically, cleaning of the SCR system was accomplished using known types of steam sootblowers. While steam sootblowers, which can be viewed as mechanical in nature, can indeed remove debris from the exposed walls of the catalyst substrate, they suffer from high capital costs, coupled with high operating and maintenance costs. Furthermore, because the steam or air and water is applied under pressure, the catalyst coating may experience significant premature wear, thus decreasing the useful life of the catalyst In an effort to overcome the known deficiencies of sootblowers in the cleaning of SCR's, an alternative cleaning arrangement has been gaining some degree of success. This emerging technology is the use of sound emitters positioned in a variety of locations. While sonic cleaning has met with limited success; however, the selection of emitter frequency, as well as the location, positioning, phasing and aiming of the emitters has been a hit or miss affair, and applied in a brute manner, rather than with the sophistication of a thought out scientific approach. Furthermore, prior applications of sonic cleaning in SCR applications used primarily high frequency emitters for cleaning because of the favored velocity effects; however, inasmuch as the high frequency waves have a relatively short wave length, and a higher rate of dissipation in the SCR substrate, the cleaning effect throughout the length of the catalyst layer has often been less than optimal.

Still further problems in the application of prior art sonic cleaning devices concerned the positioning of such emitters in a transverse direction to the flue gas flow. In such instances, there was no recognition in the prior art of the loss of cleaning effect because of the identical or near identical frequencies and phases of emitters in adjacent layers (i.e. the pulsating velocities of spaced layers of emitters would have a tendency to cancel out the cleaning effect in the catalyst layer between them).

The present invention relates to aiding in the rectifying or, in the least, alleviating the accumulation of flyash on the exposed surfaces of the catalyst.

SUMMARY OF THE INVENTION

The present invention provides a method and apparatus for cleaning, in a new and novel manner, catalyzed surfaces of a plurality of catalyst elements placed within SCR reactors.

More specifically, in one aspect of this invention, a plurality of sonic emitters are used, some of which emit high frequency and others of which emit low frequency sound waves. The improvement provided by this aspect of the present invention is that the low frequency sound waves have longer wave lengths which more or less lightly penetrate and sweep the entire depth of the SCR modules, and the more powerful, but shorter wave length of the high frequency emitters, can then be more effective for a more vigorous sweeping of the module surfaces.

The invention herein additionally includes the concept of optimizing cleaning by changing the phases of symmetrically located emitters in adjacent layers so that they are in counter phase with respect to each other. Such an arrangement will prevent the effect seen in the prior art of cancellation of the cleaning effect on the catalyst layers between spaced sets of emitters oriented transversely to the flue gas flow.

The invention herein also includes the creation of system design and positioning concepts which will permit the modeling and selection of optimal frequency, phase, and wave selection criteria.

Other features and advantages of the present invention will be apparent from the following more detailed description of the preferred embodiment which, taken in conjunction with the accompanying drawings, illustrate, by way of example, the principles of the invention.

BRIEF DESCRIPTION OF THE DRAWING

FIG. 2 also shows, in detail, fluctuating gas velocity vectors, which are fixed at the same moment in time as the fluctuating acoustic pressures indicated in FIG. 1;

DETAILED DESCRIPTION OF THE INVENTION

Figure 1:
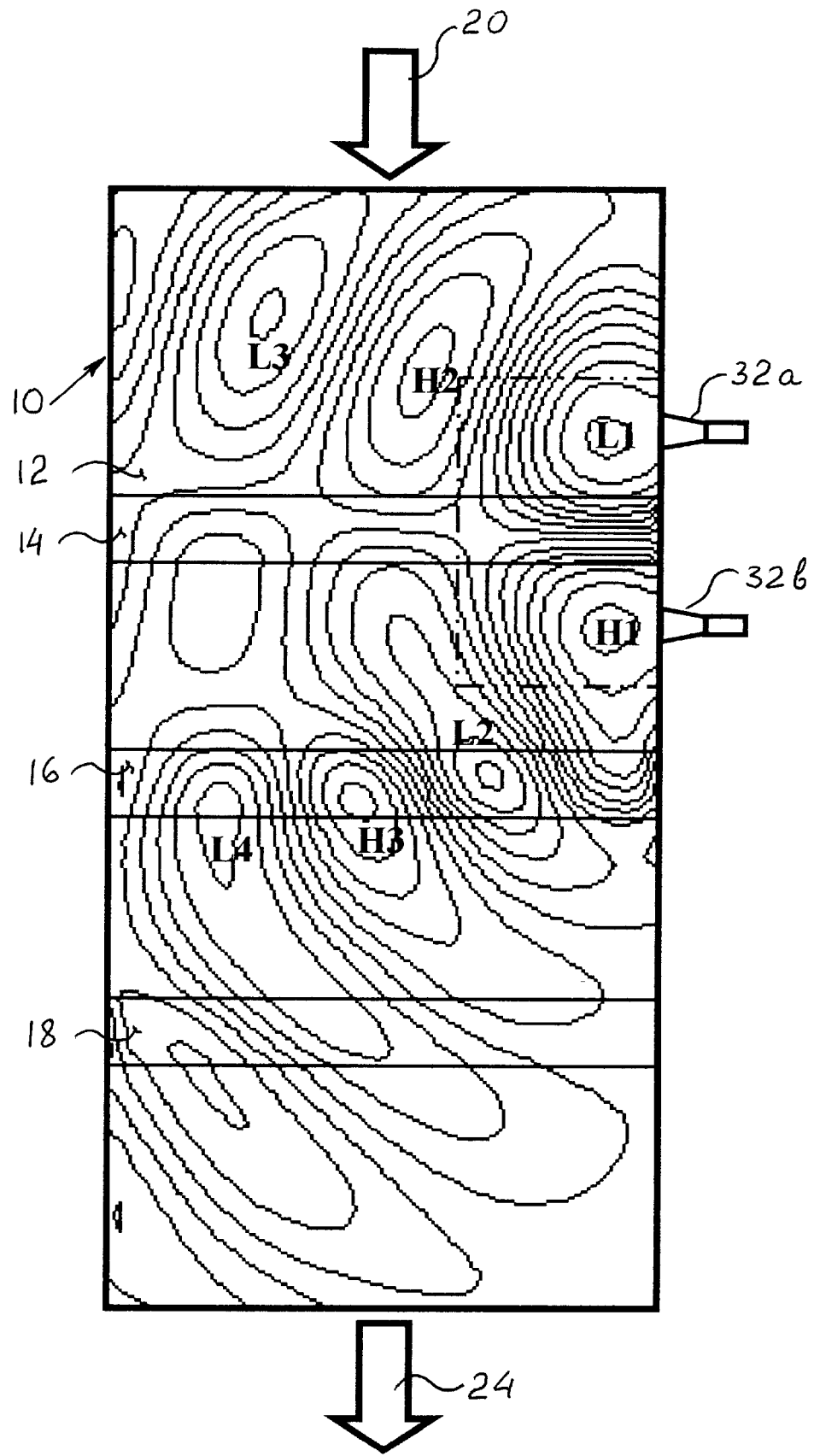
FIG. 1 is a schematic illustration of an SCR catalyst reactor illustrated with three layers of catalyst therein, and two layers of sonic horns emitting from only one side. Fluctuating high and low acoustic pressure contours, fixed at one moment in time, are also illustrated.

Referring to FIG. 1, there is illustrated an SCR reactor for NOx removal, generally indicated at 10, including a schematic illustration of an SCR reactor vessel 12. The SCR vessel 12 may be of any suitable type and, as shown, includes upper, intermediate and lower catalyst beds 14, 16 and 18, respectively, therein. With an arrangement such as shown, flue gas 20 (which is produced from burning fossil fuels in a power generation facility, not shown) containing NOx contaminants therein ,is directed through the SCR reactor 10 and the NOx content therein is reduced by a suitable nitrogenous compound, such as ammonia, in the presence of a catalyst, such as vanadium pentoxide, such that the NOx content in the exiting flue gas 24 from the reactor 10 is substantially reduced, perhaps as much as 80 to 90%, or more.

Figure 3:
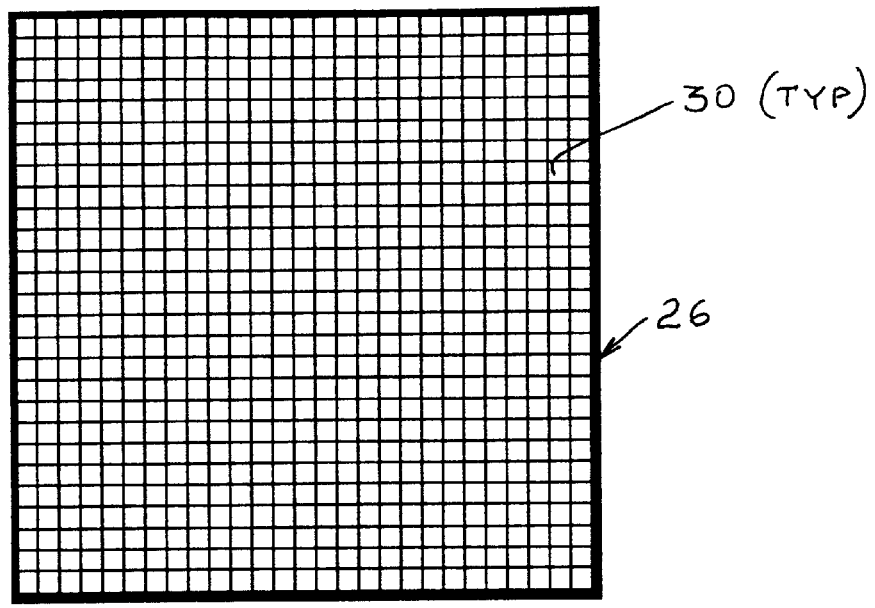
FIG. 3 is a plan view of typical honeycomb catalyst modules used in SCR systems.
Figure 4:
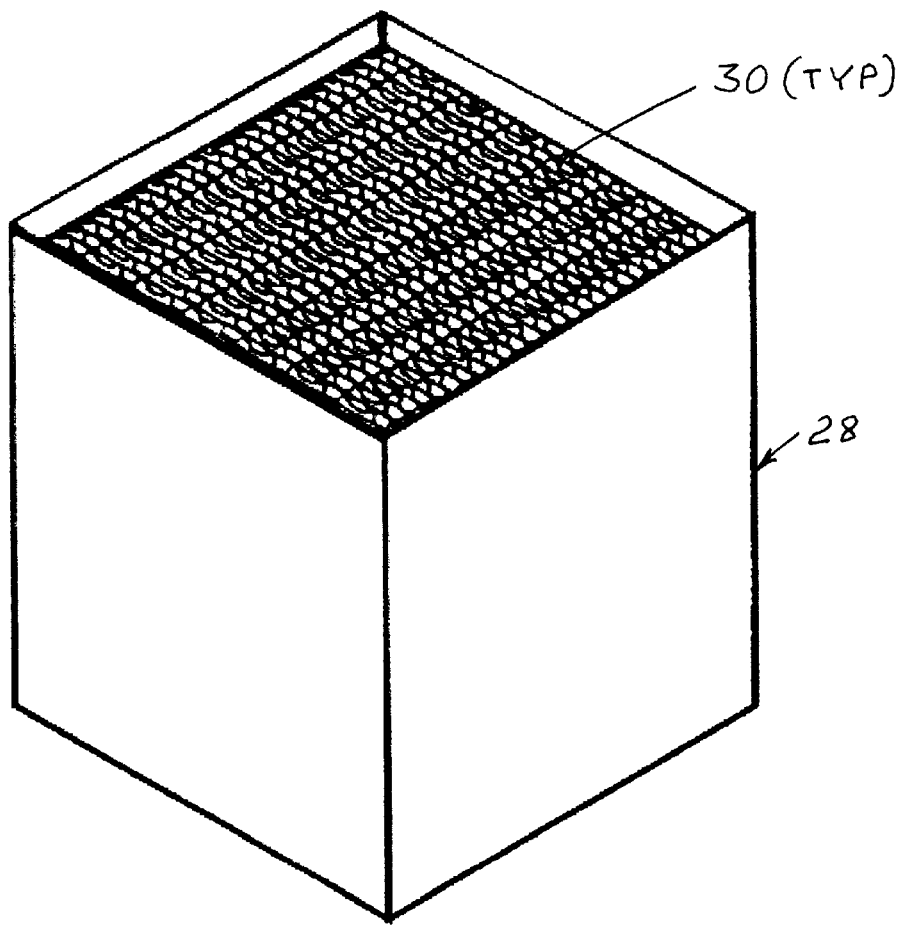
FIG. 4 is a schematic projected view of a catalyst holder containing a plate type catalysts therewithin.

The parameters for selecting the particular type of catalyst used within a reactor 10 are well known in the art, and consider a large number of variables, such as: flue gas temperature, composition, ash loading, as well as specific catalyst considerations such as catalyst type, cell size, open area, module length, and the reactor location. Both process limitations and operator preference also enter into the equation of selecting catalyst and, in this regard, the catalyst used today is generally broken into two distinct types, either honeycomb catalyst 24, such as is illustrated in plan view in FIG. 3, or plate type catalyst 26, which is illustrated in projection in FIG. 4.

It is to be noted that the references to catalyst 26 and 28 hereinabove, encompass both the substrate and the actual catalytic material 30 which is adhered to the catalyst substrate, or formed integrally therewith. In this regard, the plate type catalysts 28 are generally roll formed to create biloped undulations to achieve maximum surface area and minimum back pressure, and the catalytic material is applied to the surface areas by wash coating, paste application, or by a suitable dipping and drying technique. The honey comb catalyst 26 is normally formed by an extrusion process, and the catalytic material 30 in this instance can be formed integrally with the mixture being extruded or, in the alternative, by wash coating and/or dipping, much in the same manner as the plate type catalyst 28.

The invention herein is directed to an improved method of cleaning of the catalytic material 30 of catalyst modules, such as catalyst modules 26 and 28, through an improved use of sonic and infrasonic emitters. In this regard, and referring now to FIG. 1 there is illustrated a pair of sonic horns 32a and 32b, with 32a being the top horn, and 32b being the bottom horn. Generally, because of space constraints, horns such as 32a and 32b are typically positioned on the sides of the reactor vessel 12. As illustrated, sonic horns 32a and 32b are vertically aligned on the same side of the reactor vessel 12, positioned on opposite sides of the upper catalyst bed 14, and are mounted to emit cleaning sonic waves initially in a direction transverse to the direction of the flue gas flow 20. In the schematic illustrated in FIG. 1, there are shown a pair of sonic modules 32a and 32b on opposite vertical side of the upper catalyst bed 14. Typically, in actual applications, a plurality of transversely oriented modules will be included on oppositely opposed transverse sides of the reactor 10, and also positioned to clean the middle and lower catalyst beds 16, and 18, respectively.

Figure 2:
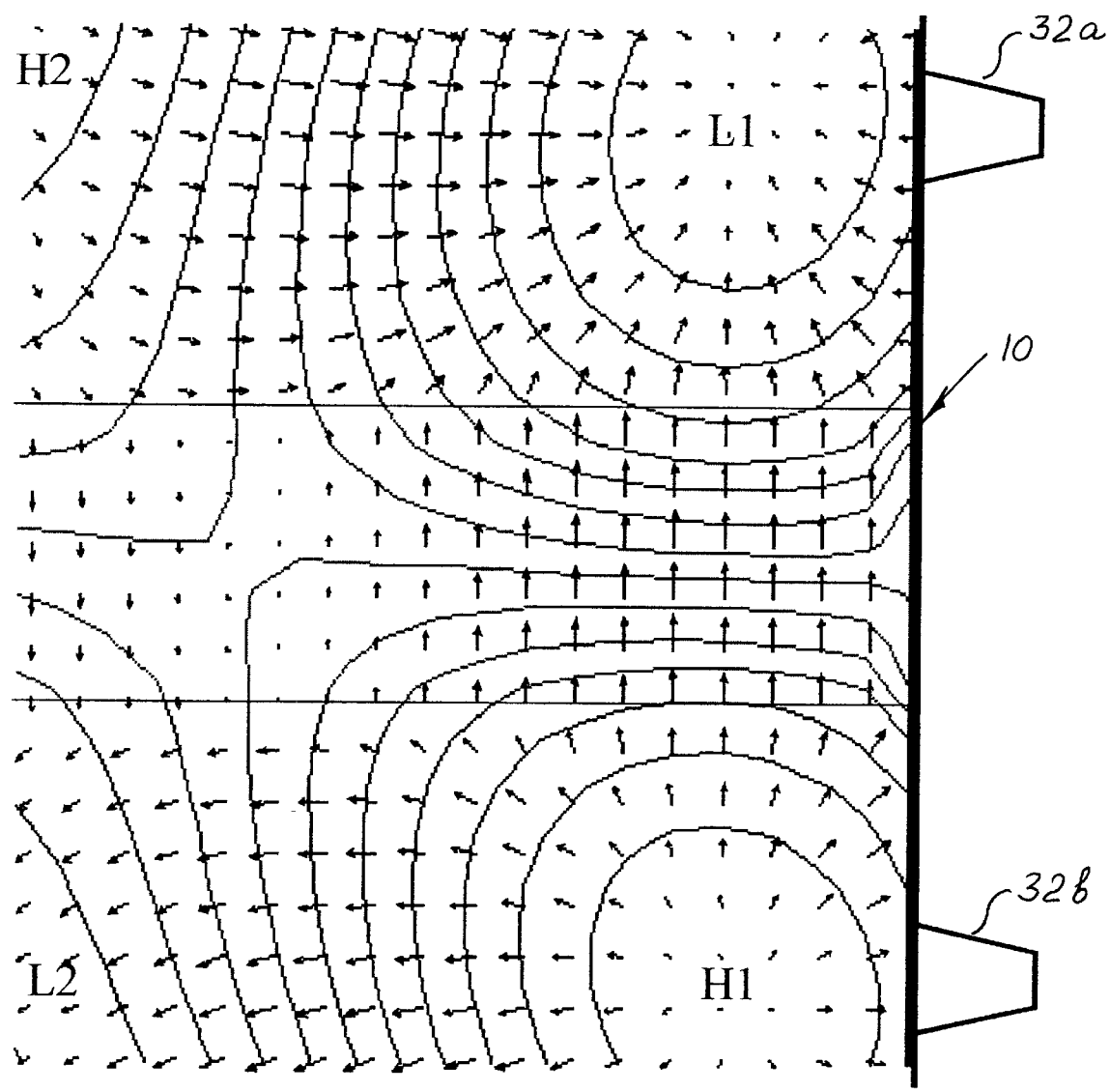
FIG. 2 is a schematic illustration of a the portion of FIG. 1, as viewed at the phantom lines shown in FIG. 1.

One very important aspect of the invention herein is the recognition that in order to properly and vigorously clean the various catalyst layers, matching spaced pairs of sonic horns, such as horns 32a and 32b should, preferably, be located symmetrically relative to the catalyst layer and the emitters operate at 180° out of phase with respect to each other. FIGS. 1 and 2 illustrate this arrangement, which results in alternate zones of high and low acoustic pressure areas on opposite sides of the catalyst layer 14 (the zones L1, H2 and L3 being created from sonic module 32a and the zones H1, L2, H3 and L4 resulting from sonic module 32b, respectively). FIG. 2 illustrates this phenomena even more graphically by overlaying the pulsating gas velocity vectors (which correlates to acoustic pressure) in an engaged area, so it can be readily seen that the 180° phase shift results in a cooperative cleaning effect, whereas if the phase shift did not occur, the cleaning effect of the emitters 32a and 32b would be opposing each other and cancelling a good deal of the cleaning effect. At this point it is to be noted that the invention herein does not require a 180° phase shift in all instances, but is seeking that the velocity antinodes of a combined sonic field are within the catalyst layer that they are directed to clean.

Another very important feature of the invention herein, particularly with honey comb catalyst modules, is the concept of using a plurality of sonic emitters, some of which emit high frequency and others of which emit low frequency sound waves. The improvement provided by this aspect of the present invention is that the low frequency sound waves have longer wave lengths which more or less lightly penetrate and sweep the entire depth of the SCR modules, and shorter wave length of the high frequency emitters, which can more efficiently overcome adhesion forces on the catalyst surfaces. From present observations, it is believed that 50 to 300 Hz may be the most appropriate for high frequency waves and 10 to 30 Hz may be the most effective for the low frequency sound waves. Furthermore, it is believed that the acoustic pressure of the high and low frequency sources should preferably be in the range of 80 to 200 dB.

I claim:

1. A method for in-situ cleaning of catalyzed surfaces of a plurality of elements placed within SCR modules, such modules being positioned within a flow path of a flue gas to remove gaseous contaminants therefrom, comprising the steps of:

positioning sources of high frequency, and low frequency sound waves in such flow path;

selectively energizing such high frequency source and directing the high frequency sound waves to effect cleaning of such surfaces;

selectively energizing such low frequency source and directing the low frequency sound waves therefrom to increase efficiency of cleaning such surfaces and to alleviate potential of pluggage;

during such last mentioned energizing, preventing coupling of the low frequency sound waves with a natural frequency of structural elements in communication with such flow path.

2. A method as specified in claim 1, wherein such high frequency and low frequency energizings occur substantially simultaneously.

3. A method as specified in claim 2, wherein the low frequency and high frequency sound waves are in the range of 10 to 30 Hz and 50 to 300 Hz, respectively.

4. A method as specified in claim 3, wherein the acoustic pressure of the high and low frequency sources is in the range of 80 to 200 dB.

5. A method as specified in claim 2, wherein such positioning of high and low frequency sources are such that the sound waves generated there from are transverse to the flow path.

6. A method as specified in claim 1, wherein the high frequency sound waves have a frequency ranging from about 50 to 300 Hz.

7. A method as specified in claim 1, wherein the low frequency sound waves have a frequency ranging from about 10 to 30 Hz.

8. A method as specified in claim 1, wherein location and frequency of the sound sources are selected so that velocity nodes from the low and high frequency sources do not coincide within the modules.

9. A method as specified in claim 1, wherein such modules are positioned in a plurality of layers spaced from one another in the direction of the flow path.

10. A method for the in-situ cleaning of catalyzed surfaces of a plurality of catalytic elements place within SCR modules, such modules being positioned within a flow path of a flue gas to remove gaseous contaminants therefrom and with a plurality of layers of such modules spaced from each other in the direction of the flow path, comprising:

positioning sources of sound on both sides of at least one of such layers;

selectively energizing such sources and initially directing the sound in a direction transverse to such flow path; and providing that the sources have a phase shift with respect to each other.

11. A method as specified in claim 10, wherein the phase shift is selected so that velocity antinodes of a combined sonic filed are within a catalyst layer.

12. A method as specified in claim 11, wherein emitters are located symmetrically relative to the catalyst layer and the emitters operate in a counter phase with respect to each other.

13. A method as specified in claim 10, wherein the phase shift between coupled emitters is selected to generate scanning beats.

\* \* \* \* \*